US007006750B1

(12) United States Patent  
Huffman et al.

(10) Patent No.: US 7,006,750 B1  
(45) Date of Patent: Feb. 28, 2006

(54) FIBER-OPTIC CABLE ATTENUATOR DEVICE

(75) Inventors: John Huffman, Conyers, GA (US); Michael Belew, Columbus, OH (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/068,150

(22) Filed: Feb. 28, 2005

(51) Int. Cl.  
*G02B 6/00* (2006.01)

(52) U.S. Cl. ..................... 385/140; 385/135
(58) Field of Classification Search .......... 385/140  
See application file for complete search history.

(56) References Cited

U.S. PATENT DOCUMENTS

| | | | |
|---|---|---|---|
| 5,561,726 A * | 10/1996 | Yao | 385/11 |
| 2003/0138234 A1 * | 7/2003 | Yong | 385/140 |

* cited by examiner

Primary Examiner—Frank G. Font  
Assistant Examiner—Derek L. Dupuis

(57) ABSTRACT

In accordance with the teachings of the present invention, a fiber-optic cable attenuator is presented. An assembly is presented for encasing a cable and providing an airtight chamber around the fiber-optic cable. The fiber-optic cable is then deflected within the assembly to allow a reading of the deflection point by an Optical Time Domain Reflectometer (OTDR). In one embodiment, the fiber-optic cable is deflected with pressurized air. In another embodiment, the fiber-optic cable is deflected with indenters fitted through the airtight chamber. As a result, initial reference data and cable location may be obtained and found without damaging the cable (i.e., using splices and other disruptive means).

19 Claims, 3 Drawing Sheets

FIBER-OPTIC CABLE ATTENUATOR DEVICE

BACKGROUND OF THE INVENTION

1. Field of the Invention

The present invention relates to communication devices and specifically fiber-optic cable devices.

2. Description of the Prior Art

Fiber-optic cables are commonly used in modern communication systems. When a fiber-optic cable is deployed in a network, various network drawings and architectural drawings are produced to depict the network. As such, when operations need to be performed on the fiber-optic cable, a technician may use the network drawings.

A conventional fiber-optic cable includes several fiber strands surrounded by protective layers. Each fiber strand consists of a glass-like core. Communication is accomplished in a fiber-optic cable by transmitting light down the glass-like core. Information is modulated on the light and conveyed between transmission points. The glass-like core has properties that can be measured and characterized.

When a fiber-optic cable is initially deployed, the cable must be tested and properly documented. As a result, if a fault occurs in the cable, a technician can properly troubleshoot the cable. For example, a fiber-optic cable may be damaged or disturbed by a backhoe or other excavation device. In addition, fiber-optic cables deployed for commercial use may have faults. For example, the glass-like core may crack or fracture under stress or when new pieces of fiber-optic cable are connected together (i.e., spliced), the two pieces of fiber-optic cable may not be properly spliced and light traveling down the glass-like core may be inappropriately reflected.

In modern networks, technicians use an Optical Time Domain Reflectometer (OTDR) to troubleshoot a fiber-optic cable. Initial test are made of the fiber-optic cable to properly calibrate the OTDR. The initial tests generate reference data that is used later to operate and locate the fiber-optic cable. An OTDR generates an initial light signal (e.g., reference trace) to characterize the fiber-optic cable. If the light encounters any discontinuities (e.g., faults), such as cracks, fractures, bends, breaks in the cable, connection points to other cables, or connections to end electronics, the initial light signal reflects back (e.g., reflected signal) to the OTDR. The OTDR calculates the distance to the discontinuity in the fiber by measuring the time elapsed between transmission of the initial light signal and reception of the reflection.

During operation of an OTDR, the OTDR is connected to the fiber-optic cable. The OTDR generates a reference trace to characterize the fiber (i.e., calibrate the OTDR). In addition, the OTDR generates a test trace to test the fiber. The reference trace is compared with the test trace. An operator inputs and maintains threshold information and known fault information. For example, the threshold information defines the amount of difference that the operator is willing to accept between a reference trace and a test trace before he considers a discontinuity a fault. Known faults are points along a cable run where the operator expects to see a discontinuity, such as a location where the fiber-optic cable is connected to other fiber-optic cables or equipment.

When new cable is deployed and the initial drawings are developed, initial readings are taken of the fiber-optic cable to identify the integrity of the cable and to physically locate the cable. For example, a fiber-optic cable may be terminated at one end so that test may be taken to calibrate the OTDR and also to identify the optical distance between the OTDR and the termination point. The reference data is used for any later readings and is also used to document the optical distance of the fiber on drawings, etc. The optical distance to various locations on the fiber-optic cable are often documented using marker numbers on the reference drawings.

In addition, when new equipment is attached to a fiber-optic cable, a new reference trace must be produced and new reference markers must be established. Therefore, there is a continual need to change and store new reference traces and update reference markers. For example, the continual development, redesign, and/or reengineering of a network results in continual changes and updates.

Reference drawings that have marker numbers along the path of the fiber-optic cable provide an optical distance. However, the reference drawings do not necessarily provide an accurate geographical distance. Sometimes the fiber-optic cable is coiled around an obstacle, such as a manhole cover, etc. As a result, during fault locating of a failed fiber-optic cable, it is very difficult to identify geographic locations based on the optical reading from the OTDR because the OTDR provides fault location data based on the optical distance. The technician must then relate the optical distance to a geographic location on a cable map.

Since the OTDR provides the optical distance along a fiber-optic path, when it is time to find a cable, it is difficult for a technician to locate the fiber-optic cable. As a result, in one conventional method, the technician has to physically go to the fiber-optic cable and create a disturbance in the cable. It should be appreciated that a similar procedure may be used when calibrating the fiber-optic cable and determining initial optical distances for documenting a cable map. The disturbance is then used to take the initial optical measurements of the fiber-optic cable or to geographically locate the fiber-optic cable.

To create a disturbance in the fiber-optic cable, the technician will cut the cable, place a terminating device on the cable, and then make the required measurements for fault isolation and/or cable documentation. In addition, if this is for initial testing of the fiber, reference data is collected. Once the location of the cable has been documented and/or the reference data has been collected, the cable must be reconnected through a cable splice. This process takes time to perform and in addition, if the cable is not properly spliced, more problems may be introduced.

Thus, a better system of calibrating and documenting a fiber-optic cable is required.

SUMMARY OF THE INVENTION

An apparatus for creating a disturbance in a fiber-optic cable is presented. As such, a technician may quickly and efficiently generate reference data for a fiber-optic cable or geographically locate a fiber-optic cable. In one embodiment, a fiber-optic cable attenuator is presented.

A fiber-optic cable attenuator comprises an outer casing including an interior region, the outer casing including an entry for receiving a fiber-optic cable into the interior region and an exit positioned in an oppositely disposed location from the entry; a first partition dividing the interior region into a first end chamber and a central chamber, the first end chamber disposed between the first partition and the entry; a second partition positioned in the interior region between the central chamber and the exit, the second partition producing a second end chamber; a first grommet interface positioned relative to the first partition to guide the fiber-optic cable, the first grommet interface for mating with a first grommet and thereby forming an airtight seal with the central chamber; a second grommet interface positioned in the second partition to guide the fiber-optic cable, the second grommet interface for mating with a second grommet and forming an airtight seal with the central chamber; and an exhaust positioned to deposit pressurized air into the central chamber, the pressurized air deflecting the fiber-optic cable.

A fiber-optic cable attenuator comprises a casing including an entry point and an exit point, the casing including an interior chamber; a cover for covering the casing; a first grommet interface positioned at an entry point of the casing, the grommet interface for housing a grommet and positioning a fiber-optic cable at the entry point of the casing, the first grommet interface in combination with the fiber-optic cable and the cover beginning an airtight seal of the interior chamber; a second grommet interface positioned at an exit point of the chamber, the exit point positioned in an oppositely disposed location of the chamber from the entry point and positioning the fiber-optic cable at the exit point, the second grommet interface in combination with the cover and the fiber-optic cable completing the airtight seal of the interior chamber; and at least one indenter movable through the casing and capable of deflecting the fiber-optic cable in the interior chamber.

A fiber-optic cable attenuator comprises a casing including an interior chamber; a cover for covering the casing; a first grommet interface positioned at an entry point of the casing, the grommet interface for housing a grommet and positioning a fiber-optic cable at the entry point of the casing, the first grommet interface in combination with the fiber-optic cable and the cover beginning an airtight seal of the interior chamber; a second grommet interface positioned at an exit point of the chamber, the exit point positioned in an oppositely disposed location of the chamber from the entry point and positioning the fiber-optic cable at the exit point, the second grommet interface in combination with the cover and the fiber-optic cable completing the airtight seal of the interior chamber; and an exhaust positioned to deposit pressurized air into the interior chamber, the pressurized air deflecting the fiber-optic cable.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
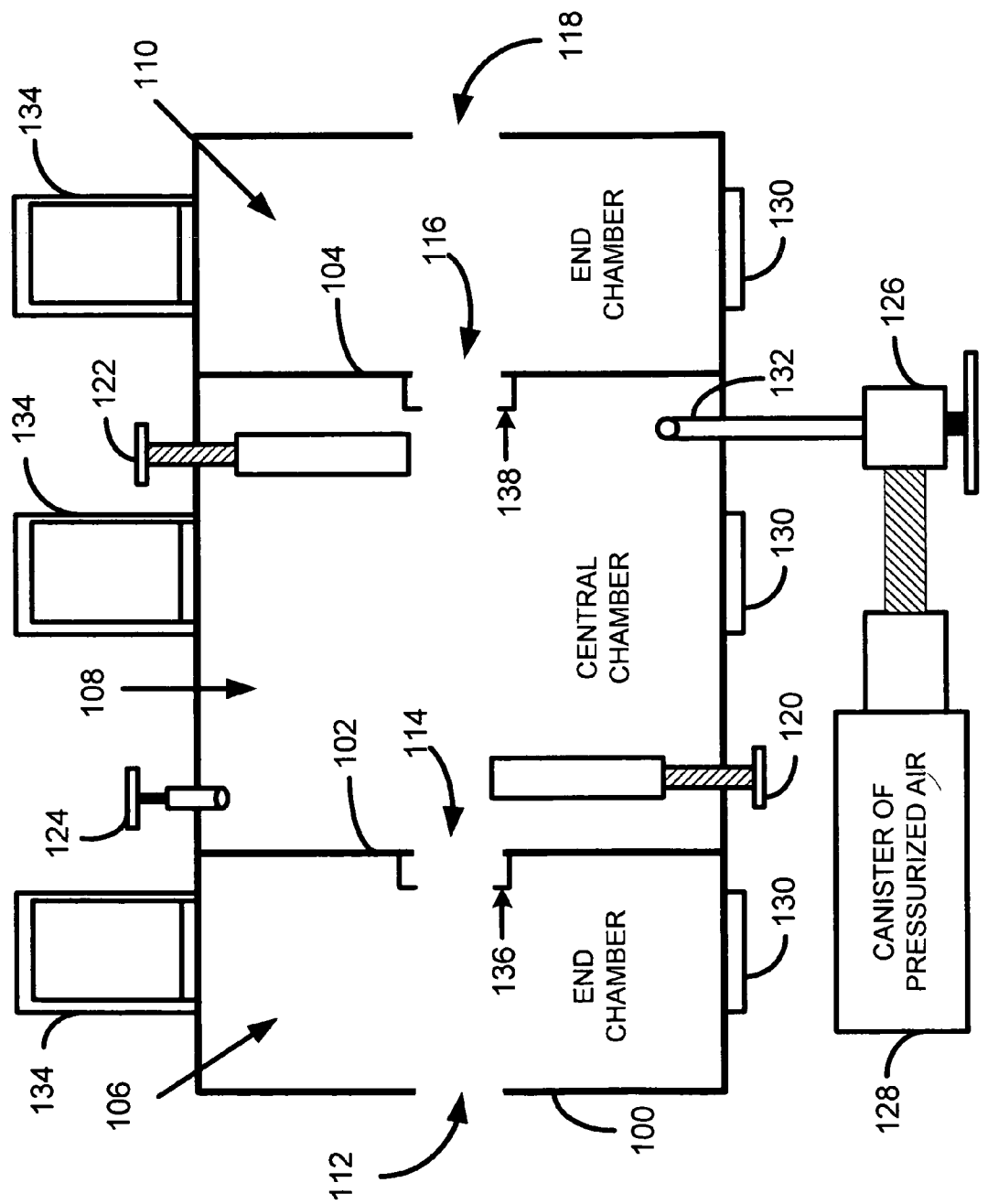
FIG. 1 displays a top view of an open fiber-optic cable attenuator implemented in accordance with the teachings of the present invention.

FIG. 1 displays a top view of an open fiber-optic cable attenuator implemented in accordance with the teachings of the present invention. An outer casing 100 is shown. Internal to the outer casing 100 is a first partition 102 and a second partition 104. The first partition 102 separates a first end chamber 106 and a central chamber 108. The second partition 104 separates the central chamber 108 and a second end chamber 110. The outer casing 100 includes restraining brackets 134 to maintain a pressure seal and to secure a fiber-optic cable in the fiber-optic cable attenuator of FIG. 1. In addition, a restraining bracket lock 130 is shown. The restraining bracket lock 130 engages the restraining bracket 134. In one embodiment, one restraining bracket lock 130 engages each restraining bracket 134.

An entry 112 is shown in the outer casing 100 for receiving a fiber-optic cable. A fiber-optic chamber is initially placed through the entry 112 to begin the alignment of the fiber-optic cable. In the alternative, a fiber-optic cable is positioned across entry 112 to align the fiber-optic cable. An exit 118 is also shown. The exit 118 provides an outlet or egress point for the fiber-optic cable from the outer casing 100. A fiber-optic cable is placed through the exit 118 to complete the alignment of the fiber-optic cable. In the alternative, a fiber-optic cable is positioned across exit 118 to align the fiber-optic cable.

In one embodiment, the entry 112 and the exit 118 are aligned to enable the straight alignment of a fiber-optic cable. It should be appreciated that any entry 112 and/or exit 118 which is positioned to facilitate the introduction of the cable into the fiber-optic cable attenuator and the exit of the cable from the fiber-optic cable attenuator is an entry 112 and an exit 118 within the meaning of the present invention. In another embodiment, the entry 112 and the exit 118 may be offset from each other and do not have to be exactly aligned. For example the entry 112 and exit 118 may be offset so that the fiber-optic cable will be taught when it is positioned in the entry 112 and the exit 118.

A grommet is an article used to position and align the fiber-optic cable in the fiber-optic cable attenuator. A variety of different interfaces are provided for mating with a grommet. For example, an opening 114, an opening 116, a grommet retainer 136, and a grommet retainer 138 are each grommet interfaces for mating with a grommet and creating an air tight seal in the central chamber 108. It should be appreciated that any fixture capable of mating and or retaining a grommet may be considered a grommet interface within the scope of the present invention.

An opening 114 is shown in first partition 102 and an opening 116 is shown in second partition 104. In one embodiment, the opening 114 and the opening 116 are both aligned with the entry 112 and the exit 118. In another embodiment, the opening 114 and/or the opening 116 are each offset from the entry 112 and/or the exit 118. A first grommet retainer 136 is shown in the first partition 102 and a second grommet retainer 138 is shown in the second partition 104.

An exhaust 132 is fitted through the outer casing 100 and positioned within the central chamber 108. Pressurized air is supplied into the central chamber 108 through the exhaust 132. The pressurized air is stored in a canister of pressurized air 128. The pressurized air is controlled by a regulator 126, which is connected between the canister of pressurized air 128 and the exhaust 132. A pressure release valve 124 is fitted into the outer casing 100 and is interjected into the central chamber 108. The pressure release valve 124 facilitates the release of pressurized air in the central chamber 108.

A first indenter 120 and a second indenter 122 are shown fitted in outer casing 100. The first indenter 120 and the second indenter 122 are positioned to engage a fiber-optic cable positioned in the fiber-optic cable attenuator shown in FIG. 1. The first indenter 120 and/or the second indenter 122 may be implemented as a plunger that will engage a fiber-optic cable or a screw device that can be lowered to engage and bend a fiber-optic cable. It should be appreciated that any apparatus, air device, etc. that will disturb the continuity of the fiber-optic cable may be considered an indenter within that is within the scope of the present invention.

Figure 2:
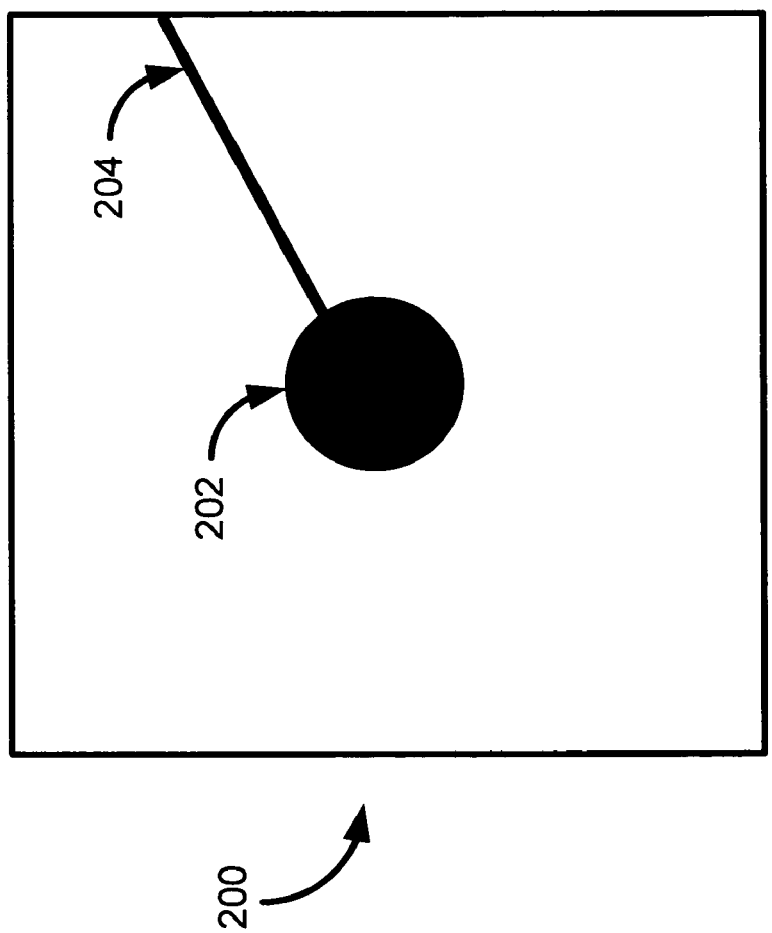
FIG. 2 displays a split grommet implemented in accordance with the teachings of the present invention.

FIG. 2 displays a planar view of a split grommet implemented in accordance with the teachings of the present invention. The split grommet 200 is used to position the fiber-optic cable in the fiber-optic cable attenuator shown in FIG. 1. The split grommet 200 includes a central opening 202 for retaining the fiber-optic cable. A split 204 facilitates the separation of the split grommet 200 and the placement of a fiber-optic cable in the central opening 202.

The operation of the fiber-optic cable attenuator depicted in FIG. 1 will be discussed using FIG. 1 and FIG. 2. During operation of the fiber-optic cable attenuator, a fiber-optic cable is placed in the split grommet depicted in FIG. 2. In one embodiment, two split grommets 200 are used for operation.

Moving to FIG. 1 as a reference, each split-grommet 200 would mate with a grommet interface. In one embodiment, each split-grommet 200 may mate with the opening 114 and the opening 118 to form an airtight seal in central chamber 108. In this embodiment, a sealing compound may be used to form the airtight seal. In another embodiment, each split grommet 200 would mate by being placed in a split grommet retainer (136, 138). For example, a first split grommet 200 would be placed in the first split grommet retainer 136 and a second split grommet 200 would be placed in the second split grommet retainer 138. In one embodiment, placing the split grommet 200 into the split grommet retainers (136, 138) would create an airtight seal between the central chamber 108 and the end chambers (106, 110). In a third embodiment, after placing the split grommet 200 into the split grommet retainers (136, 138), an adhesive or fitting may be used to create an airtight seal between the central chamber 108 and the end chambers (106, 110).

The first split grommet 200 is placed in the first split grommet retainer 136 and a second split grommet 200 is placed in the second split grommet retainer 138. The fiber-optic cable is positioned down the center of the fiber-optic cable attenuator shown in FIG. 1. For example, the fiber-optic cable would enter the outer casing 100 of the fiber-optic cable attenuator at entry 112, run though the split grommet 200 positioned in the first split grommet retainer 136, run through the split grommet 200 positioned in the second split grommet retainer 138 and exit the outer casing 100 through the exit 118.

In one embodiment, after positioning the fiber-optic cable down the center of the outer casing 100, a cover (not shown in FIG. 1) is placed on the outer casing 100 and the restraining bracket 134 is placed over the cover and interlocks with the restraining bracket lock 130. Once the restraining bracket lock 130 interlocks with the restraining bracket 134, an airtight seal is created in the central chamber 108. An operator may use the canister of pressurized air 128 to deliver air under pressure through the regulator 126 and through the exhaust 132 into the central chamber 108. The regulator 126 will allow air at a predetermined pressure, through the exhaust 132, and into the central chamber 108 causing constriction of the fiber-optic cable and attenuating the fiber core of the fiber-optic cable. As a result, an OTDR will be able to locate and measure the fault during initial reference data collection or when an operator is attempting to geographically identify the cable.

After collecting the reference data or identifying the geographical location of the cable, a pressure release valve 124 may be used to release air in the central chamber 108 and as a result, release the air pressure in the central chamber 108. Once the pressure has been released, the fiber-optic cable enclosed in the split grommets 200 may be removed. After removal, the split grommets 200 may be disconnected from the fiber-optic cable. Using this method, the fiber-optic cable can quickly be tested and placed back into operation without the need for splices, etc.

In another embodiment, after positioning the fiber-optic cable down the center of the outer casing 100, a cover (not shown in FIG. 1) is placed on the outer casing 100 and the restraining bracket 134 is placed over the cover and interlocks with the restraining bracket lock 130. Once the restraining bracket lock 130 interlocks with the restraining bracket 134, an airtight seal is created in the central chamber 108. An operator may then use one or both of the indenters 120 and 122 to deflect the fiber-optic cable. For example, if the indenter (120, 122) is implemented with a screw apparatus, the indenter (120, 122) may be lowered slowly (i.e., by turning a screw handle) until the indenter (120, 122) makes contact with the fiber-optic cable. After contact with the fiber-optic cable, the indenter (120,122) may be slowly moved until the fiber-optic cable deflects enough to allow a reading with the OTDR. As a result, an OTDR will be able to locate and measure the fault during initial reference data collection or when an operator is attempting to geographically identify the cable.

After collecting the reference data or identifying the geographical location of the cable, a pressure release valve 124 may be used to release air in the central chamber 108. Once the pressure has been released, the fiber-optic cable enclosed in the split grommets 200 may be removed. After removal, the split grommets 200 may be disconnected from the fiber-optic cable. Using this method, the fiber-optic cable can be quickly tested and placed back into operation without the need for splices, etc. It should be appreciated that a combination of the two previously discussed methods may also be used. For example, a combination of using the pressurized air and the indenter are within the scope of the present invention.

Figure 3:
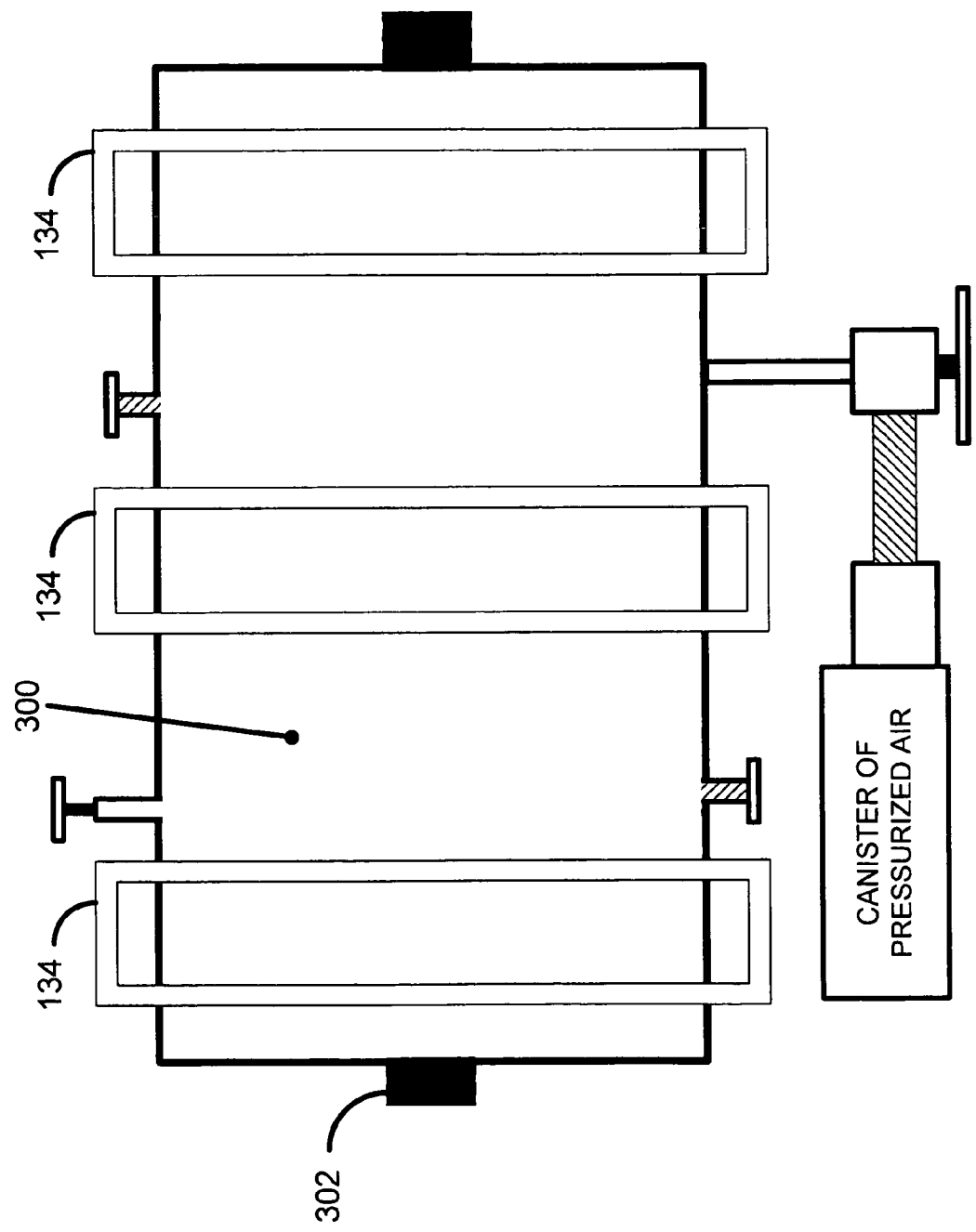
FIG. 3 displays a top view of a covered fiber-optic cable attenuator implemented in accordance with the teachings of the present invention.

FIG. 3 displays a top view of a covered fiber-optic cable attenuator implemented in accordance with the teachings of the present invention. In FIG. 3, the cover 300 of the fiber-optic attenuator is shown. In addition, the restraining bracket 134 is shown deployed across the cover 300. In the position shown in FIG. 3, the cover 300 is in a locked position and the fiber-optic cable attenuator has an airtight seal. In addition, a fiber-optic cable 302 is shown positioned down the core or center of the fiber-optic cable attenuator.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A fiber-optic cable attenuator, comprising:
an outer casing including an interior region, the outer casing including an entry for receiving a fiber-optic cable into the interior region and an exit positioned in an oppositely disposed location from the entry;

a first partition dividing the interior region into a first end chamber and a central chamber, the first end chamber disposed between the first partition and the entry;

a second partition positioned in the interior region between the central chamber and the exit, the second partition producing a second end chamber;

a first grommet interface positioned relative to the first partition to guide the fiber-optic cable, the first grommet interface for mating with a first grommet and thereby forming an airtight seal with the central chamber;

a second grommet interface positioned in the second partition to guide the fiber-optic cable, the second grommet interface for mating with a second grommet and forming an airtight seal with the central chamber; and an exhaust positioned to deposit pressurized air into the central chamber, the pressurized air deflecting the fiber-optic cable, resulting in attenuation of a light signal traveling in the cable.

2. A fiber-optic cable attenuator as set forth in claim 1, wherein the first grommet interface is implemented with an opening.

3. A fiber-optic cable attenuator as set forth in claim 1, wherein the second grommet interface is implemented with a grommet retainer.

4. A fiber-optic cable attenuator as set forth in claim 1, wherein the outer casing further comprising an entry aligned with the first grommet interface, the enabling entrance of the fiber-optic cable into the fiber-optic cable attenuator.

5. A fiber-optic cable attenuator as set forth in claim 1, wherein the outer casing further comprising an exit aligned with the second grommet interface, the exit providing an outlet for the fiber-optic cable from the fiber-optic cable attenuator.

6. A fiber-optic cable attenuator as set forth in claim 1, wherein the outer casing further comprising a release valve penetrating the central chamber and capable of releasing the pressurized air from the central chamber.

7. A fiber-optic cable attenuator as set forth in claim 1, wherein the outer casing further comprising an indenter penetrating the central chamber, the indenter capable of engaging a fiber-optic cable positioned in the central chamber and deflecting the fiber optic cable.

8. A fiber-optic cable attenuator as set forth in claim 7, wherein the indenter is implemented with a plunger.

9. A fiber-optic cable attenuator as set forth in claim 7, wherein the indenter is implemented with a pressurized air.

10. A fiber-optic cable attenuator as set forth in claim 7, wherein the indenter is implemented with a screw device.

11. A fiber-optic cable attenuator as set forth in claim 1, the outer casing further comprising an exhaust penetrating the central chamber, the exhaust delivering the pressurized air into the central chamber, the pressurized air pressurizing the central chamber.

12. A fiber-optic cable attenuator as set forth in claim 11, further comprising a regulator coupled to the exhaust, the regulator regulating the pressurized air.

13. A fiber-optic cable attenuator as set forth in claim 12, further comprising a canister of pressurized air coupled to the regulator, the canister of pressurized storing the pressurized air.

14. A fiber-optic cable attenuator as set forth in claim 1, wherein the first grommet interface is offset from the second grommet interface.

15. A fiber-optic cable attenuator, comprising:

a casing including an entry point and an exit point, the casing including an interior chamber;

a cover for covering the casing;

a first grommet interface positioned at an entry point of the casing, the first grommet interface for housing a grommet and positioning a fiber-optic cable at the entry point of the casing, the first grommet interface in combination with the fiber-optic cable and the cover beginning an airtight seal of the interior chamber;

a second grommet interface positioned at an exit point of the interior chamber, the exit point positioned in an oppositely disposed location of the interior chamber from the entry point and positioning the fiber-optic cable at the exit point, the second grommet interface in combination with the cover and the fiber-optic cable completing the airtight seal of the interior chamber; and at least one indenter movable through the casing and capable of deflecting the fiber-optic cable in the interior chamber, resulting in attenuation of a light signal traveling in the cable wherein said at least one indenter is implemented with a pressurized air.

16. A fiber-optic cable attenuator as set forth in claim 15, wherein said at least one indenter is implemented with a plunger.

17. A fiber-optic cable attenuator as set forth in claim 15, wherein the indenter is implemented with a screw device.

18. A fiber-optic cable attenuator as set forth in claim 15, wherein the outer casing further comprising an exhaust penetrating the interior chamber, the exhaust delivering pressurized air into the interior chamber, the pressurized air creating pressure in the interior chamber.

19. A fiber-optic cable attenuator, comprising:

a casing including an interior chamber;

a cover for covering the casing;

a first grommet interface positioned at an entry point of the casing, the first grommet interface for housing a grommet and positioning a fiber-optic cable at the entry point of the casing, the first grommet interface in combination with the fiber-optic cable and the cover beginning an airtight seal of the interior chamber;

a second grommet interface positioned at an exit point of the interior chamber, the exit point positioned in an oppositely disposed location of the interior chamber from the entry point and positioning the fiber-optic cable at the exit point, the second grommet interface in combination with the cover and the fiber-optic cable completing the airtight seal of the interior chamber; and an exhaust positioned to deposit pressurized air into the interior chamber, the pressurized air deflecting the fiber-optic cable resulting in attenuation of a light signal traveling in the cable.

* * * * *